(12) United States Patent
Fukuda et al.

(10) Patent No.: US 8,914,378 B2
(45) Date of Patent: Dec. 16, 2014

(54) SPECIFICATION DOCUMENT CHECK METHOD, PROGRAM, AND SYSTEM

(71) Applicant: International Business Machines Corporation, Armonk, NY (US)

(72) Inventors: Mari Fukuda, Tokyo (JP); Taiga Nakamura, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 13/751,187

(22) Filed: Jan. 28, 2013

(65) Prior Publication Data

US 2013/0198201 A1    Aug. 1, 2013

(30) Foreign Application Priority Data

Jan. 30, 2012   (JP) ................................. 2012-016377

(51) Int. Cl.
   *G06F 17/30*   (2006.01)
   *G06N 5/02*    (2006.01)
(52) U.S. Cl.
   CPC .... *G06F 17/30321* (2013.01); *G06F 17/30687* (2013.01); *G06N 5/025* (2013.01)
   USPC ............ 707/741; 707/690; 707/694; 707/798
(58) Field of Classification Search
   CPC .................... G06F 17/30286; G06F 17/30067; G06F 17/30008
   USPC ................... 707/690, 694, 741, 798, E17.011
   See application file for complete search history.

(56) References Cited

U.S. PATENT DOCUMENTS

| | | | | |
|---|---|---|---|---|
| 7,885,915 | B2 * | 2/2011 | Parson et al. | 706/47 |
| 2006/0290539 | A1 * | 12/2006 | Tomic | 341/50 |
| 2011/0035345 | A1 * | 2/2011 | Duan et al. | 706/12 |
| 2014/0040182 | A1 * | 2/2014 | Gilder et al. | 707/602 |

FOREIGN PATENT DOCUMENTS

| | | | |
|---|---|---|---|
| JP | 2009064339 | A | 3/2009 |
| JP | 2010118050 | A | 5/2010 |

* cited by examiner

*Primary Examiner* — Leslie Wong
(74) *Attorney, Agent, or Firm* — Vazken Alexanian

(57) ABSTRACT

A system for storing a specification document to be checked on a storage device in a computer readable format. A computer implemented method which stores a graph structure of rules for performance of checking, and creates a rule application table of whether a rule is an application subject. For each node rule of the graph structure, average entropy of whether a specification satisfies the rules is derived by searching the graph structure of rules. While performing a depth-first searching of the graph structure of rules, a priority order index is derived from the rule application table for each node rule. Amendment candidates are then displayed according to value of the priority order index.

9 Claims, 15 Drawing Sheets

"screen layout specification" sheet $r_0$: screen layout specification
$r_0^1$: screen ("layout" (written in double-byte phonetic character set) or "layout" (written in single-byte phonetic character set)) specification
$r_0^2$: screen * specification

FIG. 14

| Task |
|---|
| Specification document "POM0100 estimate breakdown information screen.xls" does not match the extraction rule file "screen layout.sd." |
| ⊗ It does not match extraction rule "revision person." |
| ⊗ It does not match extraction rule " creation date." |
| ⊗ It does not match extraction rule "screen ID label." |
| ⊗ It does not match extraction rule "screen ID." |
| Specification document "POM0100 estimate breakdown information screen.xls" does not match the extraction rule file "screen layout.sd." |
| ⊗ It does not match extraction rule "'screen layout specification' sheet." |
| ⚠ It does not match extraction rule "sheet contents." |
| ⊗ It does not match extraction rule "screen ID label." |
| ⊗ It does not match extraction rule "screen ID." |
| Specification document "POM0100 estimate breakdown information screen.xls" does not match the extraction rule file "screen layout.sd." |
| ⊗ It does not match extraction rule "'screen layout specification' sheet." |
| ⚠ It does not match extraction rule "sheet contents." |
| ⊗ It does not match extraction rule "screen ID label." |
| ⊗ It does not match extraction rule "screen ID." |
| ⋮ |

SPECIFICATION DOCUMENT CHECK METHOD, PROGRAM, AND SYSTEM

CROSS-REFERENCE TO RELATED APPLICATION

This application claims priority under 35 U.S.C. §119 from Japanese Patent Application No. 2012-016377 filed Jan. 30, 2012, the entire contents of which are incorporated herein by reference.

BACKGROUND OF THE INVENTION

1. Field of the Invention

The present invention relates to a check method, program, and system that use computer processing for a specification document existing in a computer readable format.

2. Description of the Related Art

In recent years methods have been proposed for the automation of checking specification documents during a System Integration (SI) project by taking advantage of software tools running on a computer system. However, the method for specifying the locations to check and method of describing contents of the check have not been determined for specification documents that are not described in a formal format according to certain rules, and automation of the specification document checking is difficult.

The limitations of a completely formal description format are excessively severe. Therefore, cost is incurred for training the responsible personnel, the description of the specification document becomes difficult to interpret, and the formal description format is unsuitable in the field.

The lack of progress of automation in large scale SI projects where automatic checking of a specification document would play an important role has caused problems such as delaying the development process, or triggering of severe software bugs.

In the field of development of large scale SI projects, the specification document is frequently described according to a semi-formal template that is a Microsoft Excel file or something similar that has a determined approximate format. However, due to the aforementioned reasons, specification document checking is difficult to automate, and thus persons still perform specification document checking visually item-by-item, and work productivity has been poor.

A technical breakthrough is needed that would make possible efficient automatic checking that targets a large volume specification document that are described based on a template.

Japanese Patent Application No. 2009-64339 discloses mechanical checking for quality and degree of completeness of items that are described by a design specification document by using a word extraction unit for extractions of words from the created design specification document in order to check contents of the specification document, measuring appearance frequency of the extracted words, and comparing a characteristic word indicating a characteristic of the design specification document that was stored beforehand by a completeness check unit and a threshold value for the degree of appearance of this characteristic word.

Japanese Patent Application No. 2010-118050 relates to an automatic method for searching patent literature rather than checking a specification document. This discloses a system that includes: a morpheme analysis unit for performing morpheme analysis with respect to patent literature data stored in a database, a statistical information calculation unit characterized as selecting a characteristic word by weighting entropy and appearance frequency of a word with respect to analyzed data, a classifier for mechanical learning of a characteristic word and discrimination between patent literatures, and an extraction unit for extraction of all patent literature belonging to a technical field relating to search output from the discrimination results of the classifier.

"XSL by Demo" from Proceedings of the 2002 Symposium on Applications and the Internet, discloses when an editing operation is performed on a GUI by a user with respect to multiple structured documents (HTML), technology that generates an XSLT file after recording an operation command generated within a tool and adding generalization processing to the operation command. According to this technology, the structured document corresponds to a specification document group, and XSLT corresponds to extraction rules.

These disclosed technologies are background technologies, and these technologies are not used for checking a specification document by a computer, are not adopted for large scale SI projects, and may not be used for checking complex specification documents having a hierarchical structure.

SUMMARY OF THE INVENTION

In order to automatically check a large sized specification document, first it is assumed that there are written rules for extraction of specification document information. If it is possible to increase the quality of the extraction rules according to the specification document group, it is likely that the specification information that can be acquired will increase, the quality of automatic checking will increase, and automatic checking will be performed efficiently.

Therefore, the goal of this invention is to provide technology for efficiently performing amendments and editing of extraction rules according to the specification document group.

The system of the present invention has a routine for performing the below listed processing.

(1) Based on specification information extraction rules and a specification document group, processing to calculate amendment priority order of extracted rules.

(2) Processing to calculate extraction rule amendment candidates from the extraction rule amendment priority order, the specification document group, and the specification document information extraction rules.

(3) Processing to provide extraction rule amendment candidates and to supply a user interface needed for checking and input operation by the user.

The system according to the present invention stores on a memory device in a computer readable format a specification document to be checked, and the system also, in a graph structure, stores rules for performing checking.

The system according to the present invention creates a rule application table for whether each specification document has an element that is a subject of application of each rule, and the system derives average entropy of whether the specification document satisfies the rules for each node rule of the graph structure by checking the rule graph structure.

The system according to the present invention next, while performing depth-first searching the rule graph structure, derives a priority order index from the rule application table with respect to each node rule. Then the system displays amendment candidate rules according to value of the priority order index.

According to one aspect of the present invention, the processing to derive the priority order index includes: counting number of elements of the specification document that are non-matching with the rule fields in the rule application table; while searching descendents of these rules, deriving a bond entropy of such rules and such descendents concerning such descendents; and using the count of non-matching specification document elements and the bond energy to derive the priority order index.

According to another aspect of the present invention, the system of the present invention performs processing to create a candidate rule capable of substitution and having restrictions that encompasses restrictions of all the rules; performs processing to use the amended candidate rule in the specification document and creates a rule application table with respect to the amended candidate rule and child rules thereof; and among the candidate rules, performs processing to determine whether there exists a specification element newly corresponding to a candidate rule, and if such a specification element exists, then appending the amended candidate rule to a new rule application table according to number of object trees of the amended candidate rule.

According to this invention, due to amendments of the extracted rules according to amended priority order, it is possible to increase quality of the extracted rules with good efficiency. Therefore it is possible to improve quality of specification document checking during a large scale SI project and to greatly decrease the time of specification document checking.

BRIEF DESCRIPTION OF DRAWINGS

FIG. 14 is a user interface screen of the conventional technology.

DETAILED DESCRIPTION OF THE PREFERRED EMBODIMENT

An embodiment of the present invention will be described below using figures. Unless specifically noted otherwise, items having the same reference sign are taken throughout the figures to designate the same item. The explanation below relates to one embodiment of the present invention, and it should be understood that there is no intention to limit this invention to the details described in this example.

Figure 1:
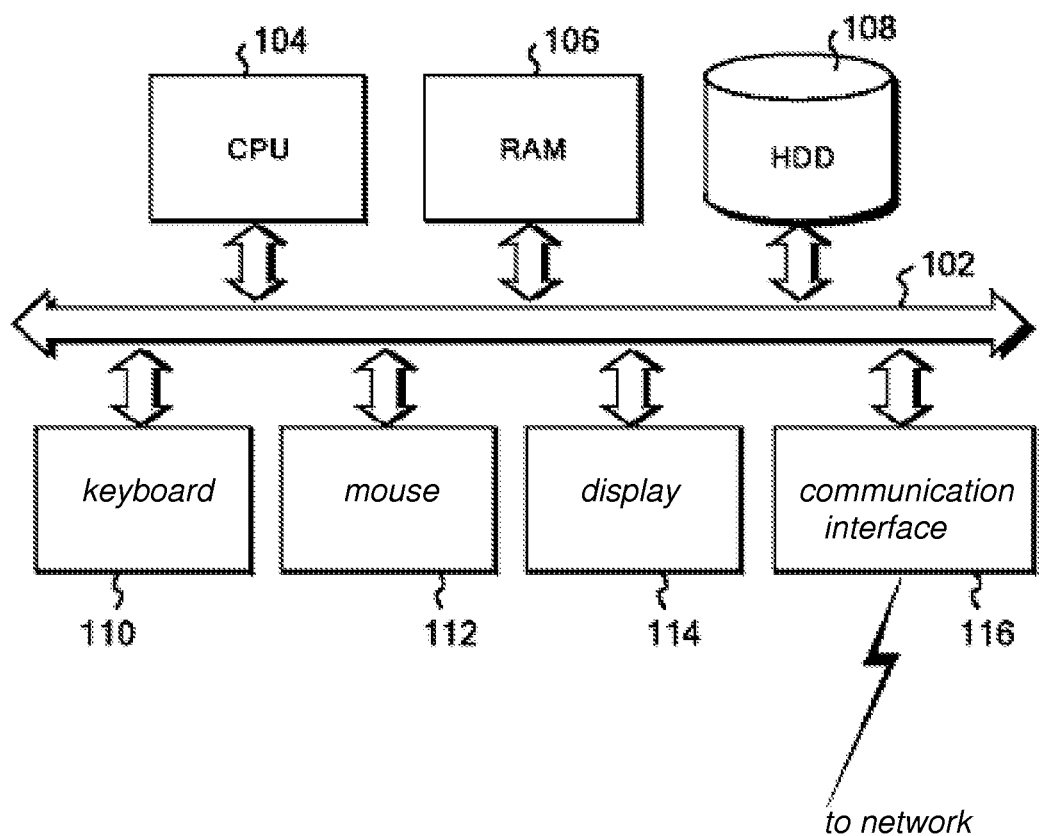
FIG. 1 is a schematic diagram showing a functional block diagram in one example of the hardware structure for implementation in one aspect of the present invention.

FIG. 1 shows a block diagram of a system and computer hardware for implementation of processing according to an embodiment of the present invention. Within FIG. 1, a CPU 104, a main memory 106 (RAM), a hard disk drive 108 (HDD), a keyboard 110, a mouse 112, and a display 114 are connected to a system bus 102. The utilized CPU 104 is preferably based on a 32 bit or 64 bit architecture, i.e. a Pentium 4, Core 2 Duo, or Xeon CPU manufactured by Intel Corp., or an Athlon CPU manufactured by AMD Corp., or the similar models. Main memory 106 preferably has a capacity of at least 4 GB. Hard disk drive 108 preferably has a capacity, for example, of at least 500 GB.

Although not shown separately, the operating system is stored beforehand on hard disk drive 108. Any operating system suitable for the CPU 104 can be used, such as Linux, or Windows 7 and Windows XP of Microsoft Corp., or the Mac OS of Apple Computer, or similar operating systems.

On hard disk drive 108 are further stored a main routine 202 described below in relation to FIG. 2, a specification document group file 204, a rule tree 206, a rule application table creation routine 208, a rule application table 210, a rule tree search routine 212, a statistical data preprocessing routine 214, a priority order index derivation routine 216, and a rule amendment routine 218. These processing routines can be created in a previously existing programming language processing system such as C, C++, C#, Java, or the similar languages. Due to running of the operating system, these routines are loaded into suitable main memory 106 and are executing. Details of operation of these routines will be described in further detail in reference to the function block diagram of FIG. 2.

Keyboard 110 and mouse 112 operate a certain GUI screen (not illustrated) and are used for starting up the processing routines or the like and for entering text.

A liquid crystal display is preferably used as the display 114 of arbitrary resolution, e.g. XGA (1024×768 pixel resolution), UXGA (1600×1200 pixel resolution), or the similar resolutions. Display 114 is used for display of verification candidates of the specification.

The system in FIG. 1 is preferably further connected to an external network such as a LAN or WAN through a communication interface connected to bus 102. Communication interface 116, using Ethernet or other interfaces, performs exchange of data with a server, client computer, or the like system located on an external network. When the system of the present invention is connected to the network in this manner, the system in FIG. 1 can be used as a server and can be operated by a separate client system. Alternatively, the system in FIG. 1 can be used as a stand-alone system.

Figure 2:
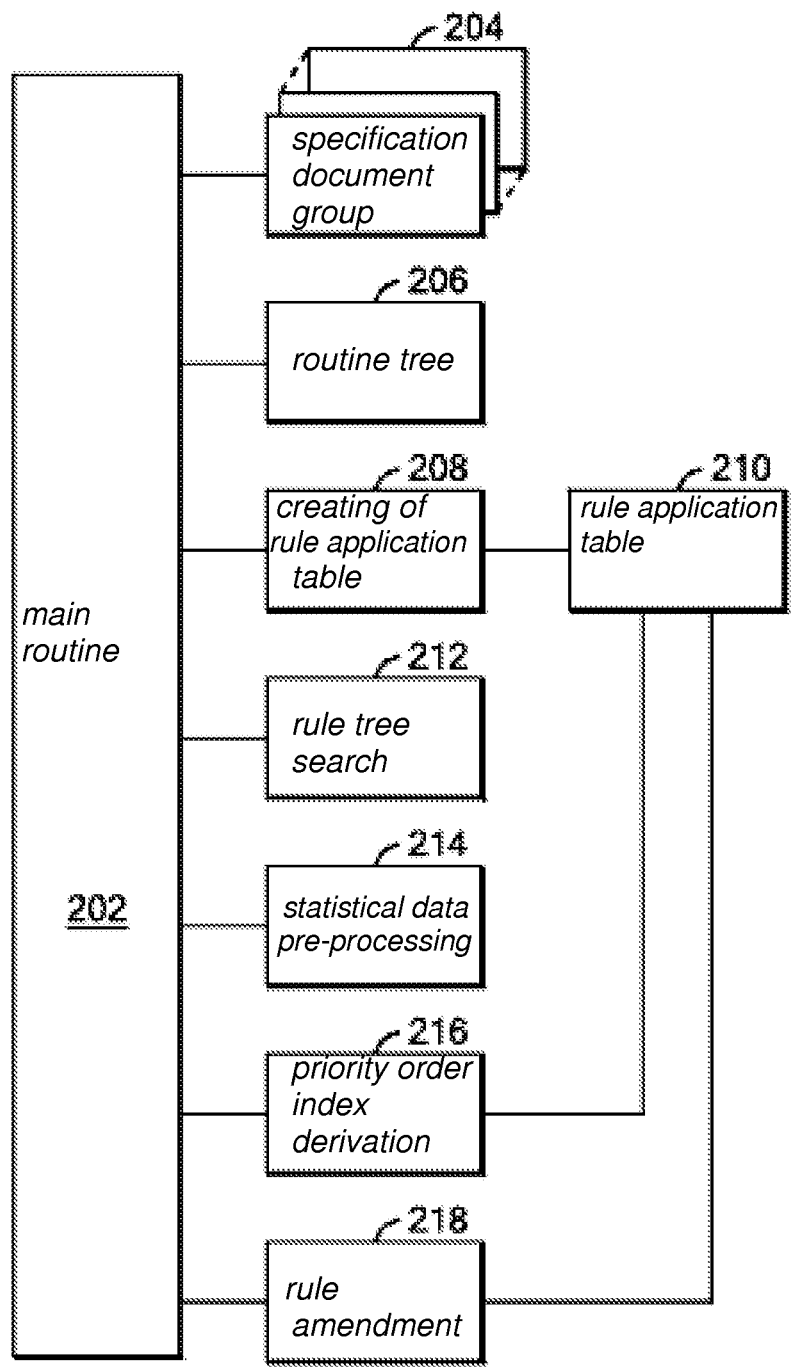
FIG. 2 is a schematic diagram showing a functional block diagram of a function configuration for implementation in one aspect of the present invention.

FIG. 2 shows a block diagram of logic structure for implementation of the present invention. Main routine 202 receives input from user keyboard 110, mouse 112, or other input devices, and main routine 202 performs the work of controlling overall processing.

Figure 3:
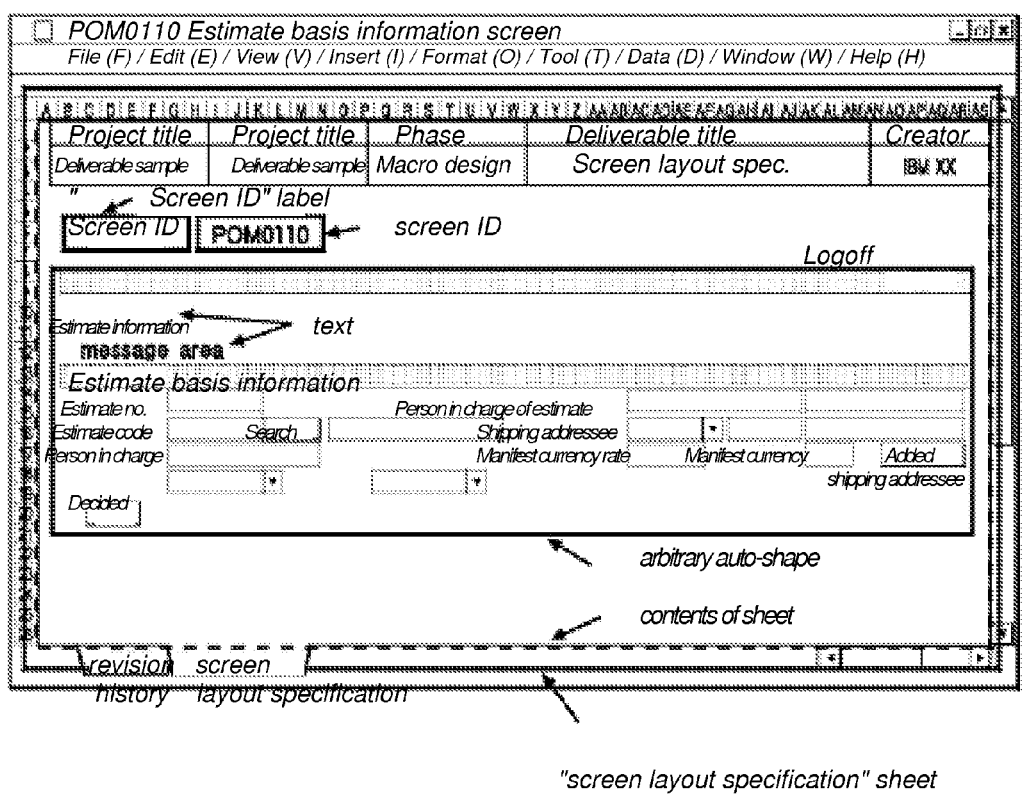
FIG. 3 is a template of a screen layout specification in one aspect of the present invention.

Specification document group 204 is preferably created using Microsoft Excel and is a group of files stored on hard disk drive 108. An example is shown in FIG. 3. Specification document group 204 can also include a general specification document group and past project data.

The format utilized for specification document group 204, rather than Excel, can be any other format, such as Microsoft Word, XML, or other formats.

Next, the extraction rules will be explained prior to explanation of rule tree 206.

The term "extraction rule" refers to an item that has a hierarchic structure and that describes at least the below listed information.

(1) Specification search conditions describe:
  search conditions according to the type of file (e.g. Microsoft Word or Excel) or according to type of element within the file (e.g. worksheet, cell, shape, or comment), and
  search conditions according to a character string pattern for matching a character string corresponding to each element type (e.g. file name, worksheet name, cell character string, shape, or character string), where the character string pattern is described by a regular expression (e.g. "screen layout specification," "screen operation summary$")

(2) Search direction describes the direction and traversal conditions to fetch contents by matching and concatenating the types and character strings (e.g., "direction=RIGHT" (right-neighboring cell), "traversal type=BORDER" (across cell border), cell coordinates)

(3) Requirement level
  This describes in what degree the existence of the item is mandatory in the specification document (e.g. must, should, may).
  Cardinality
  The number of appearances of the item expected within the specification is described as cardinality (e.g., "0 . . . 1" (0 or 1), "1", "0 . . . *" (0 to any), "1 . . . *" (one to any)).

Figure 4:
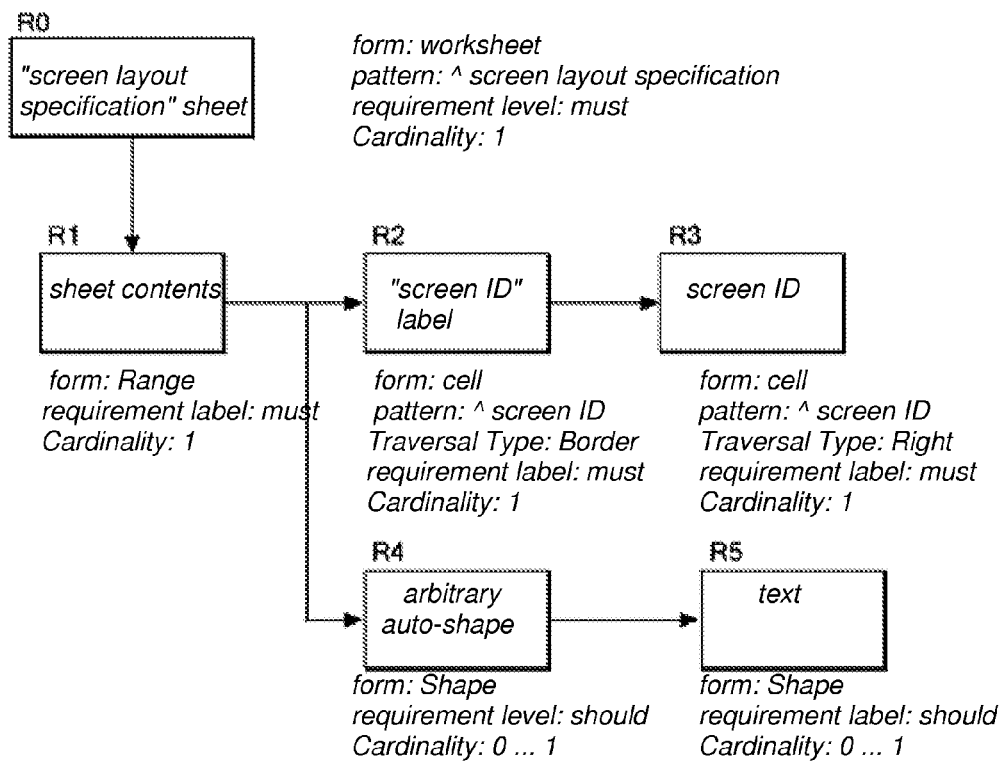
FIG. 4 is a schematic diagram showing an example of extraction rules in one aspect of the present invention.

FIG. 4 is an example of extraction rules. As shown in the figure, the rules generally appear as tree structures that have ranks. Rule tree 206 is stored on hard disk drive 108 as an extracted rule in a format that described this type of tree structure, i.e. XML.

Figure 5:
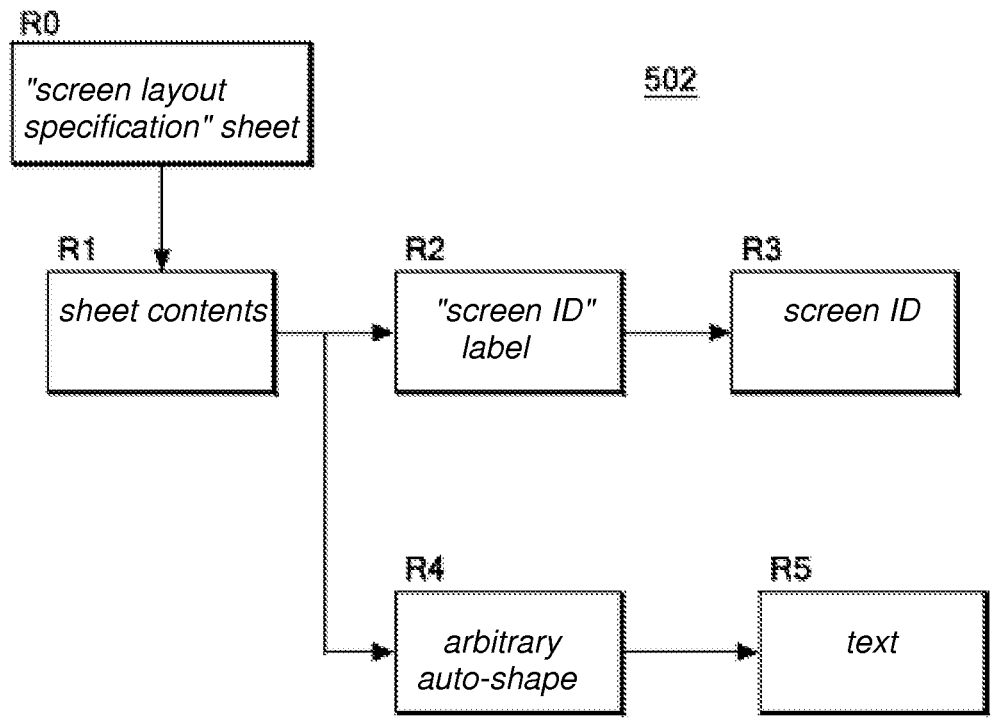
FIG. 5 is a schematic diagram showing extraction rules and a rule application table corresponding thereto in one aspect of the present invention.

Rule application table creation routine 208 performs processing to generate rule application table 210 from rule tree 206. FIG. 5 is a figure showing rule application table 504 extracted from extraction rules 502 that are rule tree 206. In rule application table 504, $S_0$, $S_1$, and $S_2$ are specification documents, and $R_0$ to $R_5$ are rules. The check marks indicate which rules are appropriate for which specification document.

Rule tree search routine 212 performs tracking processing of nodes of rule tree 206 by use of a known algorithm such as depth-first.

Statistical data preprocessing routine 214 executes preprocessing on statistical data based on the specification document group, past project data, general specification document group, and past project data.

Priority order index derivation routine 216, for each rule, performs processing to derive the priority order index from rule application table 210.

Rule amendment routine 218, while using a suitable interactive interface with the user, amends the rules and performs processing to cause reflection of amendment in rule application table 210.

Figure 6:
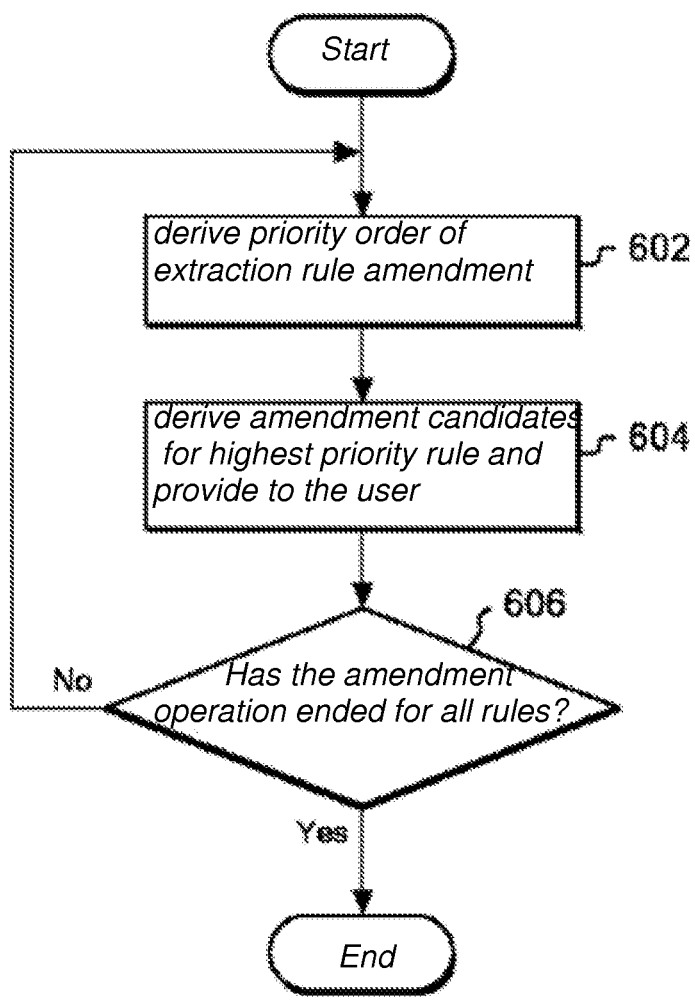
FIG. 6 is a schematic diagram showing the overall flowchart of the processing in one aspect of the present invention.

FIG. 6 shows a schematic flowchart of the overall processing of the present invention. The system shown in the function block diagram of FIG. 2, during step 602, derives priority order of extraction rule amendment. For such processing, rule tree search routine 212, statistical data preprocessing routine 214, and priority order index derivation routine 216 are called.

During step 604, the system of the present invention derives an amendment candidate with respect to the highest priority rule and provides such to the user. Thus, rule amendment routine 218 is called.

During step 606, the system of the present invention makes a determination of whether the amendment operation has been completed for all rules. Then if the amendment operation has not been completed for all rules, processing returns to step 602. Processing can be completed as determined by the user during step 606, and even though amendment processing has not finished for all rules, it is possible to complete processing by just doing amendment processing with respect to a number of rules having a high order of priority.

Figure 7:
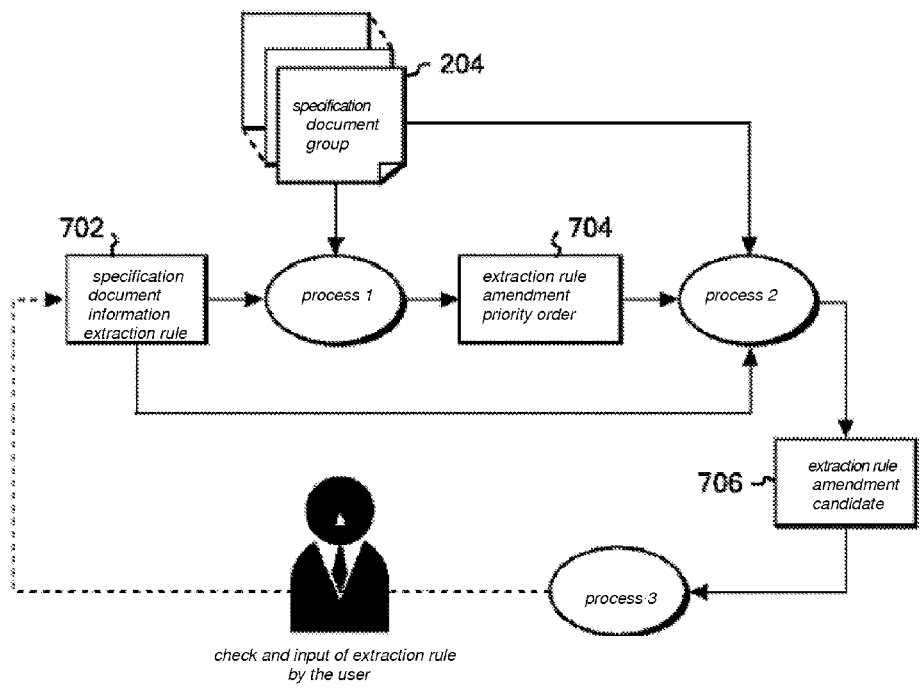
FIG. 7 is a schematic diagram showing an explanation of flow of processing in one aspect of the present invention.

FIG. 7 is a drawing for explanation of the processing of the present invention in another aspect. Within FIG. 7, there is a specification document information extraction rule 702 extracted from rule tree 206, and based on the specification document information extraction rule 702 and specification document group 204, process 1 calls a priority order index derivation routine 216 and calculates an extraction rule amendment priority order 704.

Process 2 calls a rule amendment routine 218, and from specification document group 204, specification document information extraction rule 702, and extraction rule amendment priority order 704, calculates extraction rule amendment candidate 706.

Process 3 calls rule amendment routine 218, displays extraction rule amendment candidate 706, and provides a user interface needed for confirmation and input operation by the user.

Figure 8:
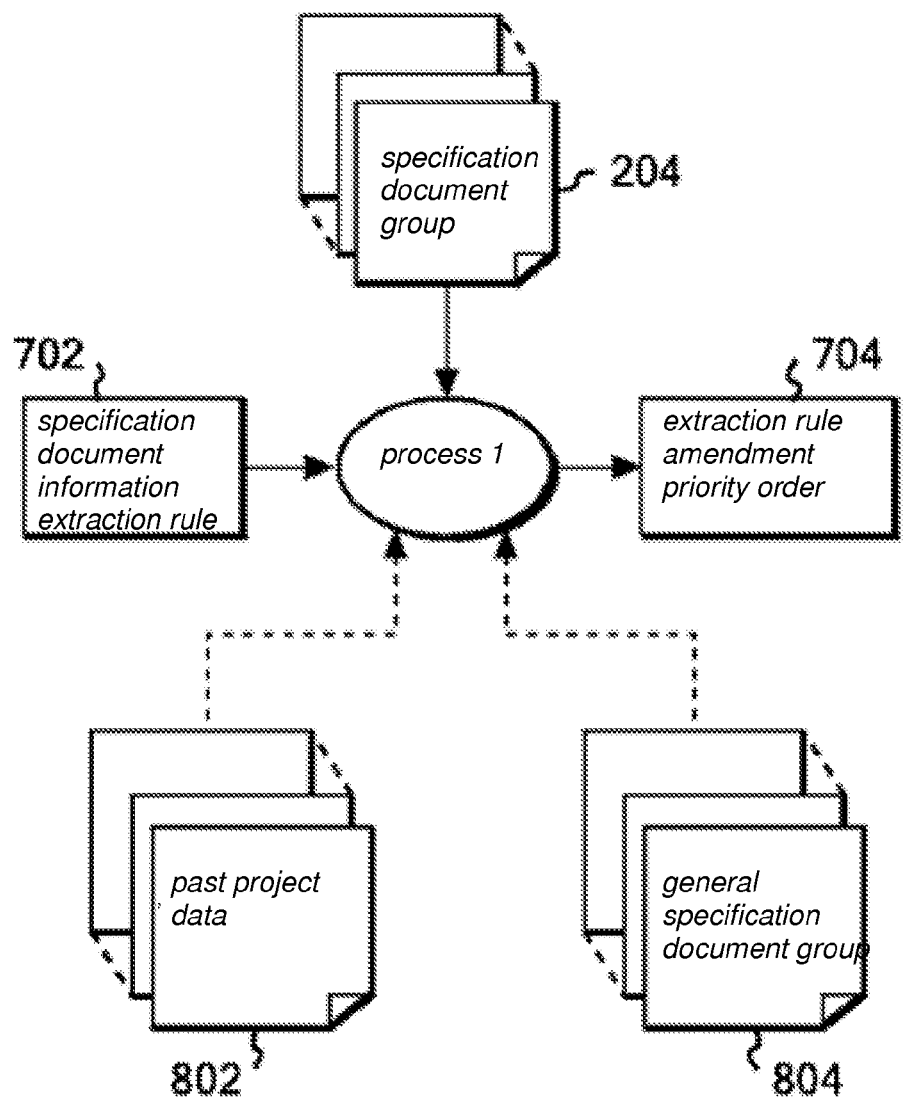
FIG. 8 is a schematic diagram showing in detail part of the flow of processing in one aspect of the present invention.

FIG. 8 is a drawing for more detailed explanation concerning the process 1 of FIG. 7. Process 1 as shown in FIG. 8, as can be required; references past project data 802 and a general specification document group 804 rather than just specification document group 204.

The priority order derivation processing will be explained next while referring to the flowchart of FIG. 9. This processing is basically executed by main routine 202 shown in FIG. 2. Main routine 202, as can be required, calls rule application table creation routine 208, rule tree search routine 212, statistical data preprocessing routine 214, priority order index derivation routine 216, and rule amendment routine 218.

Figure 9:
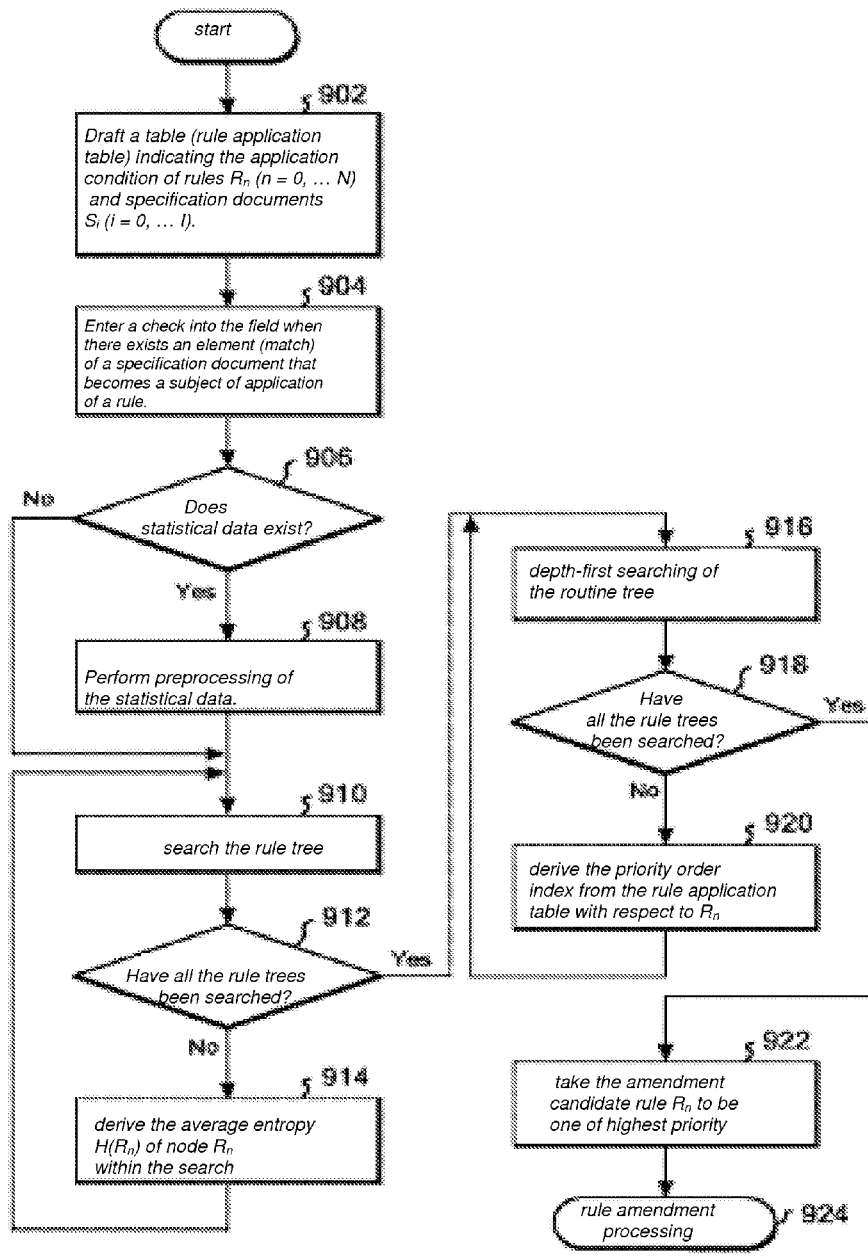
FIG. 9 is a flowchart showing the priority order derivation processing in one aspect of the present invention.

During step 902 of FIG. 9, main routine 202 calls rule application table creation routine 208 and creates a rule application table 210 that shows application state of the rules $R_n$ (n=0, . . . , N) and specification documents $S_i$ (i=0, . . . , I). Rule application table 504 in FIG. 5 is shown as an example of rule application table 210.

During step 904, if an element exists in the specification document that becomes an appropriate subject of (i.e. matches) a rule, then as shown in the rule application table 504 of FIG. 5, rule application table creation routine 208 enters a check in a field of rule application table 504. Actually processing is performed by a computer writing "1" at a certain position of memory of data of the table.

During step 906, main routine 202 determines whether there are statistical data for calculation of probability of matching for each rule. If the statistical data do not exist, then main routine 202 immediately proceeds to step 910.

If statistical data exist, then main routine 202 calls statistical data preprocessing routine 214. Processing of the statistical data preprocessing routine 214 will be explained while referring to the flowchart of FIG. 10.

Figure 10:
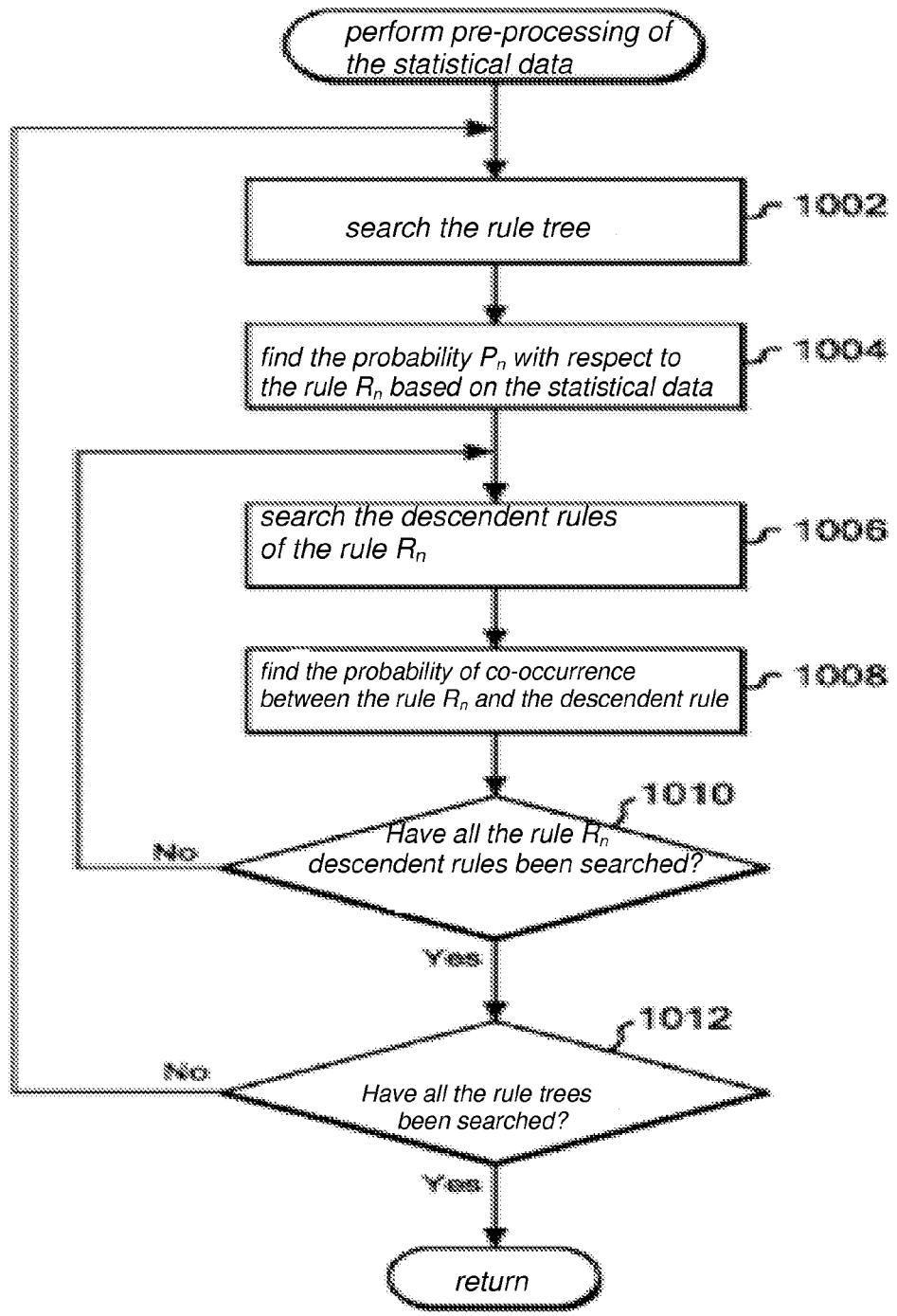
FIG. 10 is a flowchart showing the processing steps to perform preprocessing on statistical data in one aspect of the present invention.

In FIG. 10, statistical data preprocessing routine 214 searches the rule tree 206 during step 1002.

During step 1004, based on the statistical data, statistical data preprocessing routine 214 finds a probability Pn with respect to this rule Rn. The statistical data are data that are obtained beforehand based on project data 802 shown in FIG. 8, general specification document group 804.

Statistical data preprocessing routine 214 searches for descendents of the rule Rn during step 1006.

During step 1008, statistical data preprocessing routine 214 finds probability of co-occurrence between the rules Rn descendents.

During step 1010, statistical data preprocessing routine 214 determines whether all descendents of rule Rn have been searched, and if all such descendents have been searched, processing proceeds to step 1012. If all such descendents have not been searched, processing returns to step 1006.

During step 1012, statistical data preprocessing routine 214 determines if all rule trees have been searched, and processing returns to step 1002 if all rule trees have not been searched. If all rule trees have been searched, processing returns to step 908 of FIG. 9.

Main routine 202 proceeds from step 908 to step 910, and by calling rule tree search routine 212, searches rule trees during step 910.

During step 912, main routine 202 determines if all rule trees have been searched. If all rule trees have not been searched, the average entropy H(Rn) of the node Rn within the are calculated by the following formula during step 914.

$$H(Rn) = -P_{Rn} \log P_{Rn} - (1-P_{Rn})\log(1-P_{Rn})$$

The base of the log is set to 2. $P_{Rn}$ is the probability of a certain rule Rn matching the specification document. For calculation of the probability $P_{Rn}$, statistical data are used as exemplified by a specification document group used in past projects, a generally used random file group. If there are no statistical data, $P_{Rn}$ is set to ½.

Returning from step 914 to step 910, the rule trees are searched further. During step 912, when it is determined that all rule trees have been searched, main routine 202 proceeds to step 916. During step 916, a depth-first order the rule trees is carried out by calling rule tree search routine 212.

During step 918, main routine 202 determines whether all rule trees have been searched. If all rule trees have not been searched, priority order index derivation routine 216 is called during step 920.

The processing of priority order index derivation routine 216 will be explained in further detail while referring to the flowchart of FIG. 11.

Figure 11:
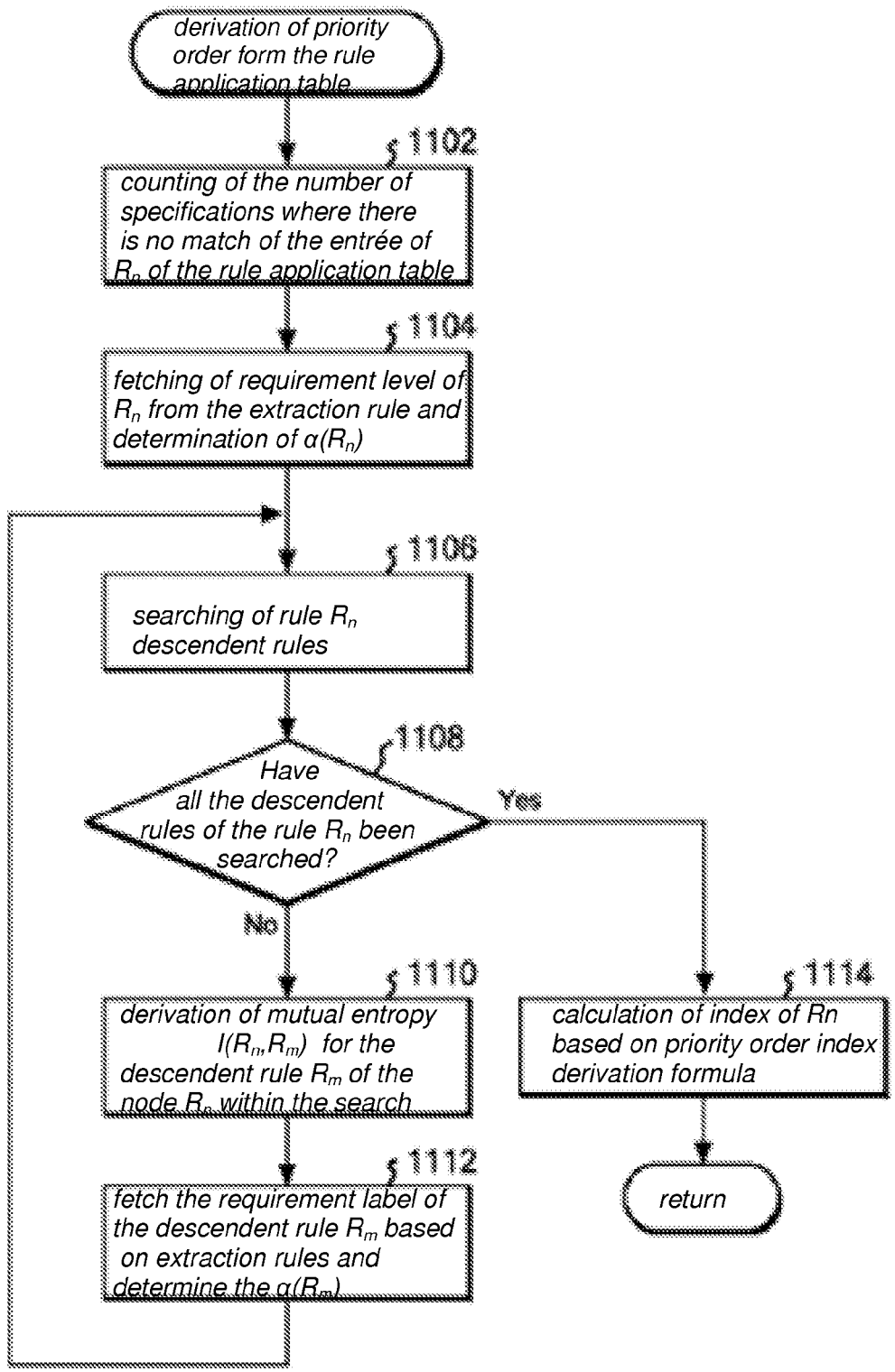
FIG. 11 is a flowchart showing the processing steps to derive priority order from the rule application table in one aspect of the present invention.

In FIG. 11, priority order index derivation routine 216 during step 1102 counts the number of non-matching specification documents based on the Rn field of the rule application table.

Next, priority order index derivation routine 216, during step 1104, fetches the Rn requirement level from the extraction rules and determines α(Rn). Here, α(Rn) means a value corresponding to the requirement level of the Rn. For example, selection is made such that if the requirement level of Rn="must," α(Rn)=1.0. If the requirement level of Rn="should," then α(Rn)=0.9. If the Rn requirement level="may," then α(Rn)=0.6. If the requirement level Rn="optional," α(Rn)=0.5.

Next, during step 1106, priority order index derivation routine 216 searches descendents of the rule Rn.

Then during step 1108, a determination is made as to whether all descendents have been searched. If all descendents are determined to have been searched, processing proceeds to step 1114.

When it is determined during step 1108 that all descendents have not been searched, priority order index derivation routine 216 during step 1110 calculates mutual entropy I(Rn, Rm) from the descendents Rm of node Rn within the search. The mutual entropy I(Rn,Rm) is given by the below listed formula.

$$I(Rn,Rm)=H(Rn)+H(Rm)-H(Rn,Rm)$$

Here, H(Rn) and H(Rm) are the average entropies that were explained in relation to step 914.

Moreover, H(Rn,Rm) is the bond entropy of Rn and Rm and is given by the following formula.

$$H(Rn, Rm) = -\sum_{P_{Rn,Rm}} \log P_{Rn,Rm} \qquad [\text{Formula 1}]$$

The bond entropy formula is written in a specific manner as follows.

P(Rn match ∧ Rm match)log P(Rn match ∧ Rm match)

P(Rn match ∧ Rm does not match)log P(Rn match ∧ Rm does not match)

P(Rn does not match ∧ Rm match)log P(Rn does not match ∧ Rm match)

P(Rn does not match ∧ Rm does not match)log P(Rn does not match ∧ Rm does not match)

Then during step 1112, priority order index derivation routine 216 fetches the Rm requirement level from the extraction rules, determines α(Rm), and returns to step 1106.

When priority order index derivation routine 216 had determined in this manner during step 1108 that all descendents had been searched, the index of Rn is calculated during step 1114 using the priority order index derivation formula. The priority order index derivation formula is given as follows.

$$N_{Rn} * \left\{ a(Rn) * H(Rn) + \sum_{m \in descendant-nodes} I(Rn, Rm) * a(Rm) * H(Rm) \right\} \qquad [\text{Formula 2}]$$

Within this formula, $N_{Rn}$ is the number of specification documents that do not match Rn, and amendment order increases as the priority order index becomes higher.

The priority order index derivation formula shown here is just one example. For example, a formula can be used such as (number of specification documents without an Rn match)×(number of "must" nodes among descendent nodes)×α(Rn). However, when the mutual entropy is not included in the formula for priority order index derivation, several of the policies for rule amendment priority order derivation might become non-satisfied. Therefore a priority order index derivation formula is preferably used that includes the mutual entropy.

For explanation, several examples of priority order derivation will be indicated. For example, the following is obtained when $P_{Rn}$=½ and $P_{Rm}$=½.

$$H(Rn)=-(1-\tfrac{1}{2})\log(1-\tfrac{1}{2})-(\tfrac{1}{2})\log(\tfrac{1}{2})=1$$

$$H(Rm)=-(1-\tfrac{1}{2})\log(1-\tfrac{1}{2})-(\tfrac{1}{2})\log(\tfrac{1}{2})=1$$

At this time, if Rn does not match, then Rm definitely does not match. For example, if a worksheet is found, then cells are not found. The probability of Rm matching when Rn does not match is the same as $P_{Rm}$ (Rm and Rn are independent). The requirement levels of Rn and Rm are taken to be "must" ($\alpha=1$), and the Rn child node is taken to only be Rm.

This results in the following type of calculations.

$P(Rn$ match $\wedge Rm$ does not match$)=\frac{1}{4}$ $P(Rn$ match $\wedge Rm$ does not match$)=\frac{1}{4}$ $P(Rn$ does not match $\wedge Rm$ match$)=P(Rn$ does not match$)*P(Rm$ does match$|Rn$ does not match$)=0$ $P(Rn$ does not match $\wedge Rm$ does not match$)=P(Rn$ does not match$)*P(Rm$ does not match$|Rn$ does not match$)=\frac{1}{2}$ From the above calculation:

$H(Rn,Rm)=-\frac{1}{4}\log(\frac{1}{4})-\frac{1}{4}\log(\frac{1}{4})-\frac{1}{2}\log(\frac{1}{2})=\frac{1}{2}+\frac{1}{2}+\frac{1}{2}=3/2$ $I(Rn,Rm)=1+1-3/2=\frac{1}{2}$ Taking this to be the case, the priority order index of $Rn=\alpha(Rn)*H(Rn)+\alpha(Rm)*I(Rn,Rm)*H(Rm)=1*1+1*(\frac{1}{2})*1=1.5$ As a further separate example, in the case of $P_{Rn}=\frac{1}{2}$ and $P_{Rm}$:

$H(Rn)=-(1-\frac{1}{2})\log(1-\frac{1}{2})-(\frac{1}{2})\log(\frac{1}{2})=1$ $H(Rm)=-(1-\frac{1}{2})\log(1-\frac{1}{2})-(\frac{1}{2})\log(\frac{1}{2})=1$ Here, when Rn and Rm are independent:

$P(Rn$ match $\wedge Rm$ match$)=\frac{1}{4}$ $P(Rn$ match $\wedge Rm$ does not match$)=\frac{1}{4}$ $P(Rn$ does not match $\wedge Rm$ match$)=P(Rn$ does not match$)*P(Rm$ match$|Rn$ does not match$)=\frac{1}{4}$ $P(Rn$ does not match $\wedge Rm$ does not match$)=P(Rn$ does not match$)*P(Rm$ does not match$|Rn$ does not match$)=\frac{1}{4}$ From the above:

$H(Rn,Rm)=-\frac{1}{4}\log(\frac{1}{4})-\frac{1}{4}\log(\frac{1}{4})-\frac{1}{4}\log(\frac{1}{4})-\frac{1}{4}\log(\frac{1}{4})=\frac{1}{2}+\frac{1}{2}+\frac{1}{2}+\frac{1}{2}=2I(Rn,Rm)=1+1-2=0$ Taking this to be the case, then the priority order index of $Rn=\alpha(Rn)*H(Rn)+\alpha(Rm)*I(Rn,Rm)*H(Rm)=1*1+1*0*1=1$ From the above, it is understood that priority order index is lower when Rn and Rm have a dependent relationship than when Rn and Rm are independent.

When priority order index has been calculated in this manner, priority order index derivation routine 216 returns to step 920. Leading from step 916 to step 918, if it was determined during step 918 that all rule trees had been searched, the main routine 202 during step 922 sets the amendment candidate rule Rn as the rule that has the highest priority order index, and main routine 202 calls the rule amendment routine during step 924.

Figure 12:
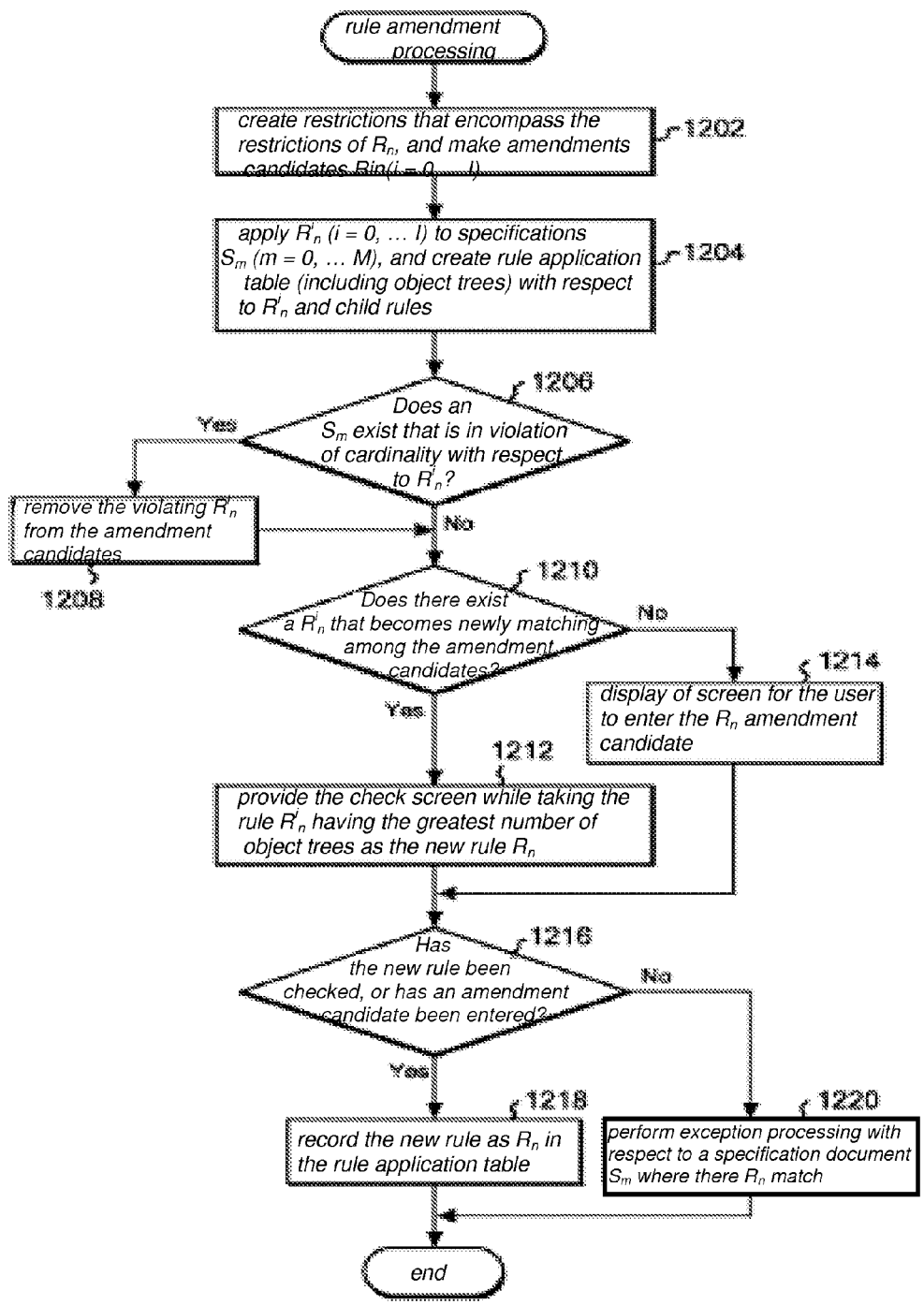
FIG. 12 is a flowchart showing rule amendment processing in one aspect of the present invention.

Rule amendment processing will be explained next while referring to the flowchart of FIG. 12.

During step 1202, rule amendment routine 218 creates restrictions encompassing the restrictions of Rn to make the amendment candidates $R^i n$ (i=0, . . . , I). The meaning of the expression "restriction encompassing the restrictions of Rn" will be indicated by the following example. Assume that the restriction of R0 is described as "a sheet including in the name the character string pattern 'screen layout specification'." Then assume that in specification S0 there is a "screen layout specification" sheet, and assume that in specification S1 there is a "screen layout specification" sheet (single-byte phonetic text). At this time "screen layout specification" and "screen layout specification" are found by calculation as (single-byte phonetic text) common character strings, and a restriction screen encompassing the restriction of R0 (pattern termed the layout or layout (single-byte phonetic text) specification) is created. The longest common subsequence or general algorithm method can be used, for example, as the method for finding the common character string by calculation.

Figure 13:
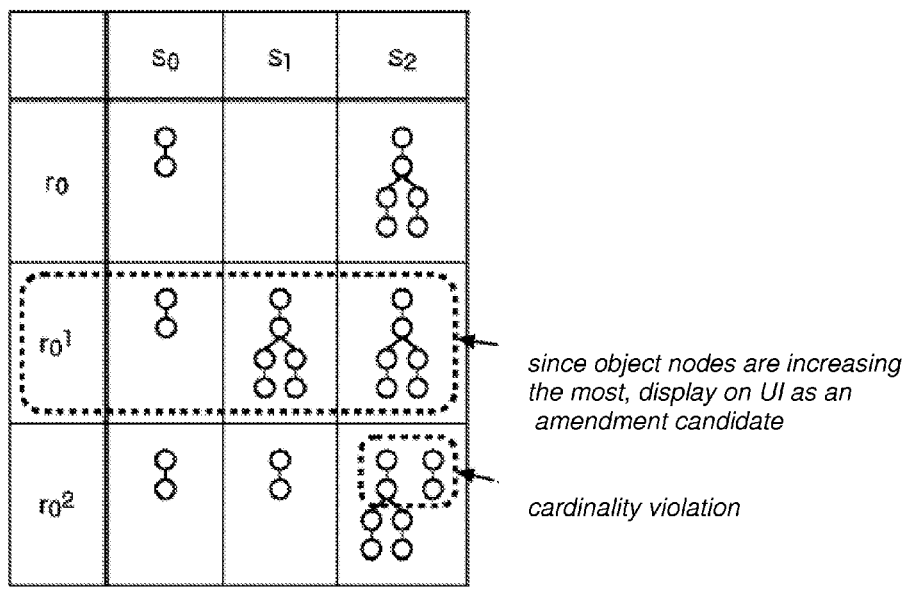
FIG. 13 is an example of a rule application table that includes object trees in one aspect of the present invention.

During step 1204, rule amendment routine 218 applies $R^i n$(i=0, . . . , I) to the specifications Sm (m=0, . . . , M), and creates a rule application table that includes object trees with respect to $R^i n$ and child rules thereof. FIG. 13 shows an example of a rule application table that includes object trees.

During step 1206, rule amendment routine 218 determines whether there exists a Sm that is in violation of cardinality with respect to $R^i n$. If it was determined that there is such violation, the violated $R^i n$ is removed from the amendment candidates during step 1208, and processing proceeds to step 1210. If it was determined that there was no such violation, processing proceeds immediately to step 1210.

Figure 15:
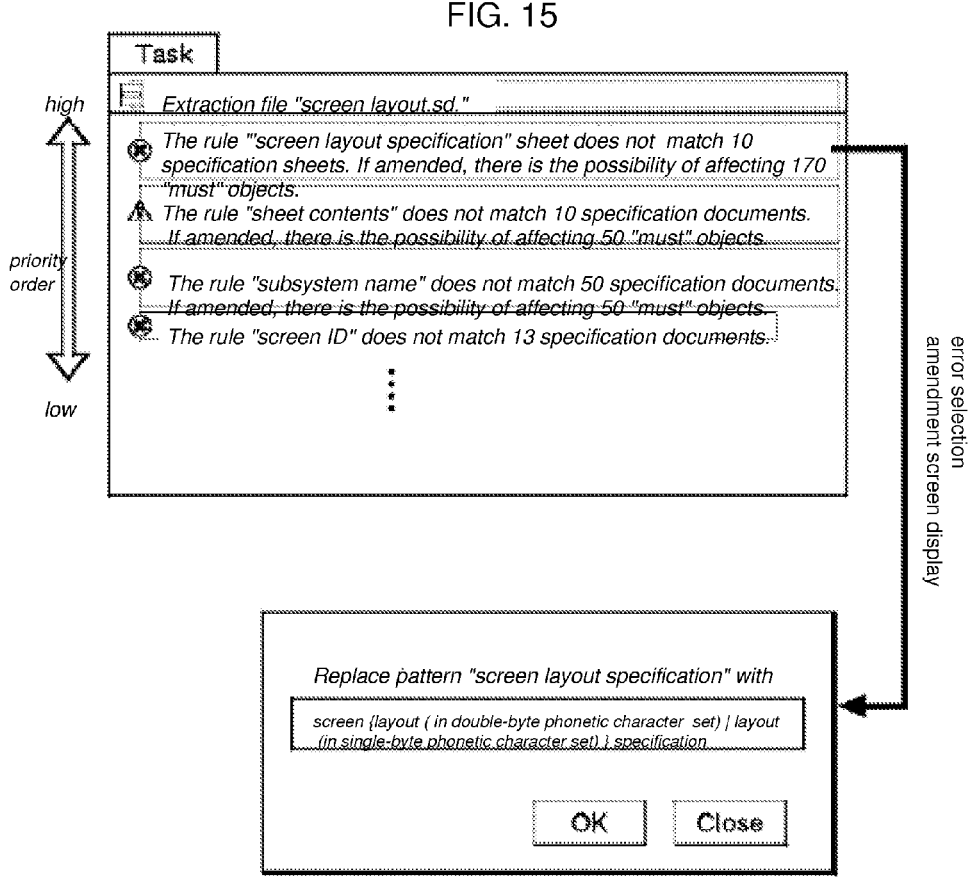
FIG. 15 is a user interface screen in one aspect of the present invention.

During step 1210, rule amendment routine 218 determines whether there exists an $R^i n$ that has become newly matching. If it is determined that no such $R^i n$ has been found, rule amendment routine 218 proceeds to step 1214, and a screen for receiving Rn amendment candidate input from the user is displayed on display 114. FIG. 15 shows an example of a screen for receiving amendment candidate input from the user. For comparison FIG. 14 shows a screen for receiving amendment candidate input from the user according to the conventional technology. In the screen of FIG. 15, the amendments are listed by order of priority, and it is easily visually understood which candidate should be amended.

When rule amendment routine 218 determines during step 1201 that there exists an $R^i n$ that has become newly matching, during step 1212, rule amendment routine 218 presents a confirmation screen where $R^i n$ that has the greatest number of object trees is taken to be a new rule Rn. This confirmation screen basically has an interface similar to that of FIG. 15.

After step 1212 or step 1214, processing proceeds to step 1216. During step 1216, rule amendment routine 218 determines whether a new rule was recognized or there was input of an amendment candidate. If this was the case, then Rn is recorded as a new rule in rule application table 210 during step 1218, and processing ends.

If a new rule was not recognized and there was no input of an amendment candidate, then amendment routine 218 provides a warning so that exception processing is performed with respect to the specification document Rn that does not match Rn. The term "exception processing" is taken to mean that the subject specification document is determined to depart from the template, communication to a responsible person so that the specification document is revised or the specification document is removed.

Amendment of a rule using the interface shown in FIG. 15 means that the user checks and inputs extraction rules by the process 3 of FIG. 7, and processing is reinitiated using specification document information extraction rule 702 amended in this manner.

Although the present invention was explained above according to a specific example, a person skilled in the art of this field will understand that the present invention is not limited to a specific operating system or platform, and the present invention can be realized using any computer system.

The invention claimed is:

1. A computer implemented method for checking a specification document on a computer system, the computer system having a memory unit for storing the specification document to be checked in a computer readable format on the memory unit and storing on the memory unit rules in a graph format for performing checking; wherein the specification document checking method comprises the steps of:

creating a rule application table of whether an element of the specification document is a subject of application of the rules;

deriving an average entropy of whether the specification document satisfies the rules for each node rule of the graph structure by checking the rule graph structure;

using the average entropy from the rule application table at each node rule while checking the rule graph structure by a depth-first search;

deriving a priority order index; and displaying an amendment candidate rule according to value of the priority order index.

2. The method according to claim 1, wherein the step of deriving the priority order index further comprises the following steps:

counting a number of elements of the specification document that are non-matching with the rule fields in the rule application table;

while searching descendents of the rules, deriving a mutual entropy of the rules concerning the descendents; and using a count of non-matching specification document elements and the mutual entropy to derive the priority order index.

3. The method according to claim 1, further comprising the steps of:

creating a candidate rule capable of substitution and having restrictions that encompasses restrictions of all the rules;

using the candidate rule in the specification document and creating a rule application table with respect to the candidate rule and child rules thereof; and determining whether there exists a specification element newly corresponding to a candidate rule among the candidate rules; and if the specification element exists, appending the candidate rule to a new rule application table according to number of object trees of the candidate rule.

4. A non-transitory computer executed specification check program product for checking a specification document on a computer system, storing the specification document for checking in a computer readable format, and storing on a memory unit a prepared graph structure for performance of checking, wherein the computer system executes the steps of a method comprising:

creating a rule application table of whether an element of the specification document is a subject of application of the rules;

deriving an average entropy of whether the specification document satisfies the rules for each node rule of the graph structure by checking the rule graph structure;

using the average entropy from the rule application table at each node rule while checking the rule graph structure by a depth-first search;

deriving a priority order index; and displaying an amendment candidate rule according to value of the priority order index.

5. The program according to claim 4, wherein the step of deriving the priority order index further comprises:

counting the number of elements of the specification document that are non-matching with the rule fields in the rule application table;

deriving a mutual entropy of the rules and the descendents while checking descendents of the rules; and using the count of non-matching specification document elements and the mutual entropy to derive said priority order index.

6. The program according to claim 4, wherein the program executes on the computer system further comprises the following steps:

creating a candidate rule capable of substitution and having restrictions that encompasses restrictions of all the rules;

using the candidate rule in the specification document and creating a rule application table with respect to the candidate rule and child rules thereof; and determining among the candidate rules whether there exists a specification element newly corresponding to a candidate rule, and if a specification element exists, then appending the candidate rule to a new rule application table according to number of object trees of the candidate rule.

7. A computer implemented specification check system for checking a specification document the specification check system comprising:

a memory unit;

a specification document to be checked, this specification document being stored in a computer readable format on a memory unit;

a graph structure data of rules for checking, this graph structure data being stored in a computer readable format on the memory unit;

a creating unit for creating a rules application table of whether an element of the specification document is an applicable subject of the rules;

an average entropy derivation unit for deriving an average entropy of whether the specification document satisfies the rules for each node rule of the graph structure by checking the rule graph structure;

a priority order index derivation unit, which checks the rule graph structure by a depth-first search, and using the average entropy from the rule application table at each node rule, and deriving a priority order index; and a display means for displaying an amendment candidate rule according to value of the priority order index.

8. The system according to claim 7, wherein the priority order index derivation unit further comprises:

a counting unit for counting the number of elements of the specification document that are non-matching with the rule fields in the rule application table;

a mutual entropy derivation unit, for searching descendents of the rules, for deriving a mutual entropy of the rules and descendents;

wherein the priority order index derivation unit uses the count of non-matching specification document elements and the mutual entropy to derive the priority order index.

9. The system according to claim 7, wherein the system further comprises:

a candidate rule creating unit for creating a candidate rule capable of substitution and having restrictions that encompasses restrictions of all the rules;

a rule application table creating unit for using the candidate rule in the specification document and creating a rule application table with respect to the candidate rule and child rules; and an appending unit, among the candidate rules, for determining whether there exists a specification element newly corresponding to a candidate rule, and if the specification element exists, then appending the candidate rule to a new rule application table according to number of object trees of the candidate rule.

* * * * *